(12) United States Patent
Holscher et al.

(10) Patent No.: US 9,161,513 B2
(45) Date of Patent: Oct. 20, 2015

(54) BIRD FEEDER

(71) Applicant: Holscher Products, Inc., Fowler, IN (US)

(72) Inventors: Joseph B Holscher, Fowler, IN (US); Steven B Zehring, West Lafayette, IN (US)

(73) Assignee: HOLSCHER PRODUCTS, INC, Fowler, IN (US)

( * ) Notice: Subject to any disclaimer, the term of this patent is extended or adjusted under 35 U.S.C. 154(b) by 98 days.

(21) Appl. No.: 14/066,194

(22) Filed: Oct. 29, 2013

(65) Prior Publication Data

US 2014/0116344 A1 May 1, 2014

Related U.S. Application Data

(60) Provisional application No. 61/719,851, filed on Oct. 29, 2012.

(51) Int. Cl.
*A01K 5/015* (2006.01)
*A01K 39/01* (2006.01)

(52) U.S. Cl.
CPC ............ *A01K 5/015* (2013.01); *A01K 39/0106* (2013.01)

(58) Field of Classification Search
CPC .............................. A01K 5/00; A01K 39/0106
USPC ...................................................... 119/51.03
See application file for complete search history.

(56) References Cited

U.S. PATENT DOCUMENTS

| | | | | |
|---|---|---|---|---|
| 2,961,994 A * | 11/1960 | Kopietz | ...................... | 119/51.03 |
| 2,984,208 A * | 5/1961 | Kopietz | ...................... | 119/51.03 |
| 3,664,303 A * | 5/1972 | Baensch | ...................... | 119/51.03 |
| 5,076,214 A * | 12/1991 | Petit | ............................ | 119/51.03 |
| 6,085,691 A * | 7/2000 | Loehndorf | ................. | 119/51.01 |
| 6,386,142 B1 | 5/2002 | Holscher et al. | | |
| 7,124,708 B2 * | 10/2006 | Rollmann et al. | ......... | 119/51.03 |
| 2015/0144065 A1 * | 5/2015 | Chen | .......................... | 119/51.03 |

OTHER PUBLICATIONS

Wild Birds Unlimited, Inc., website: www.wbu.com; various dates prior to Oct. 2011 (From THE WAYBACK MACHINE, www.archive.org.

* cited by examiner

*Primary Examiner* — Kristen C Hayes
(74) *Attorney, Agent, or Firm* — E. Victor Indiano; Indiano Law Group, LLC

(57) ABSTRACT

A wild animal feeder is provided for holding a food block having a passageway therein. The feeder comprises a base member and a roof member. The base and roof members define a food receiving space there between for receiving a food block. A food block engaging member has a proximal end and a distal end. A food block engaging member coupler is provided that is attached to one of the base member and roof member for coupling the food block engaging member to one of the base member and roof member for permitting the food block engaging member to move between a food block engaging position and a food block release position. In the food block engaging position, the food block engaging member is positioned in the food receiving space between the roof and base member to engage the food block for maintaining the food block on the feeder on the food receiving space. In the food block released position, the food engaging member is positioned to permit the food block to be inserted into the food receiving space.

20 Claims, 15 Drawing Sheets

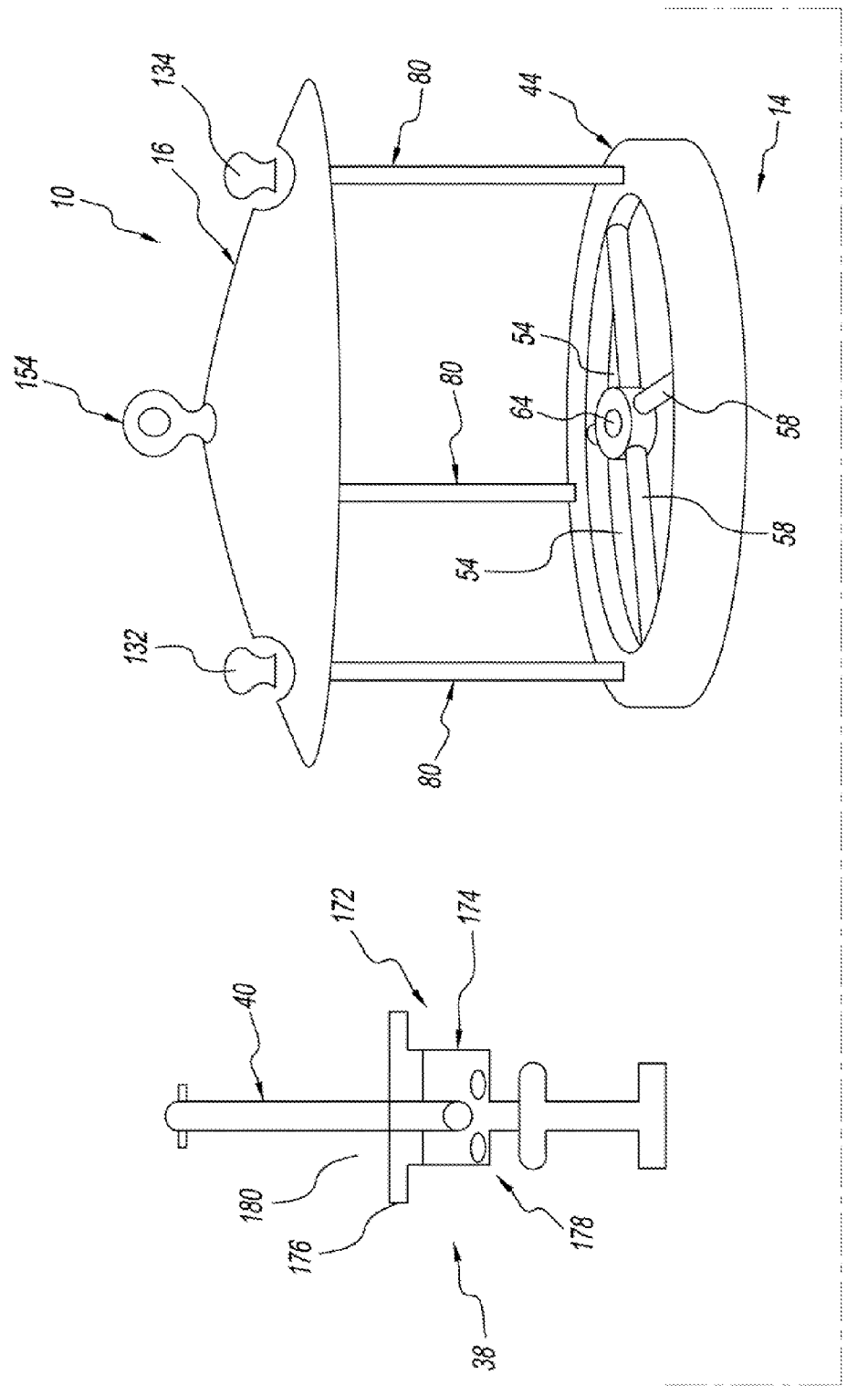

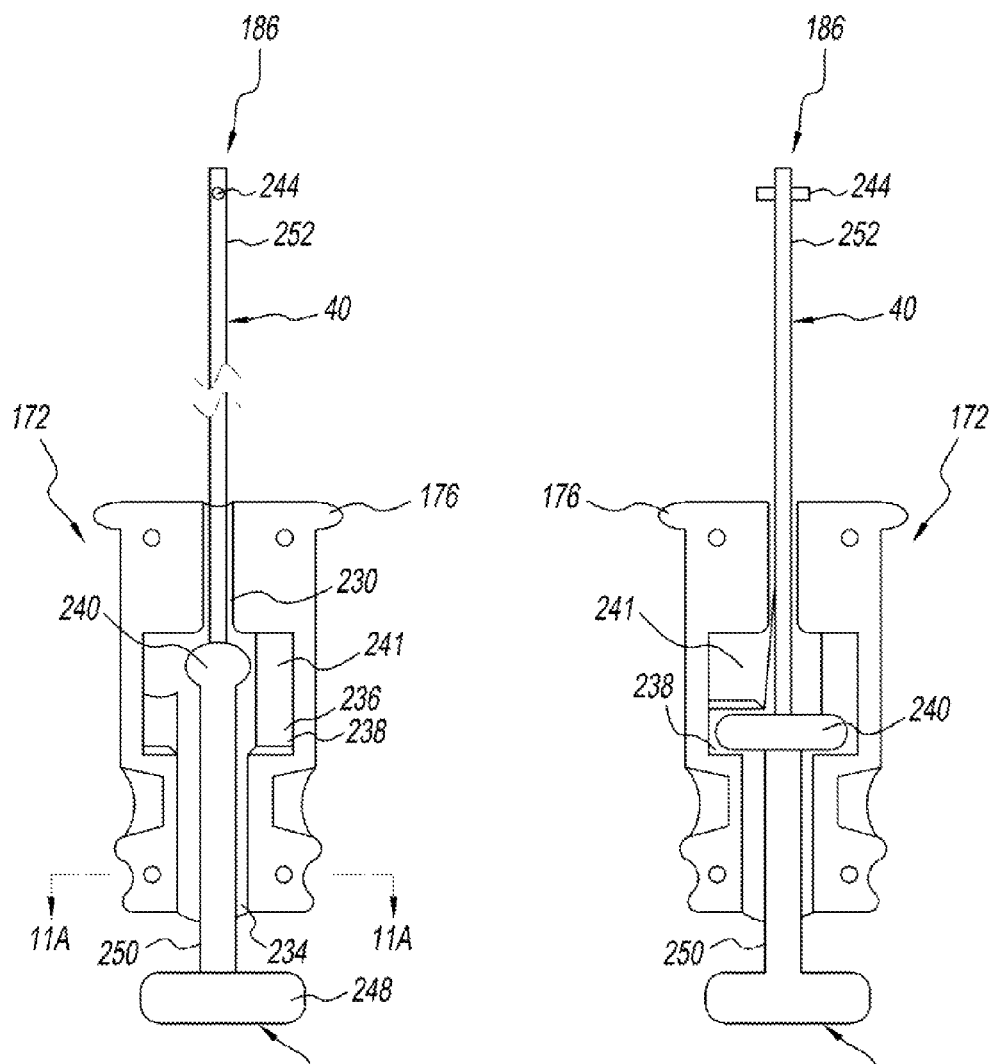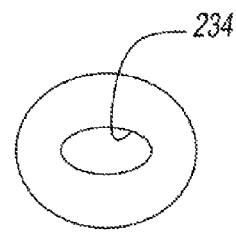

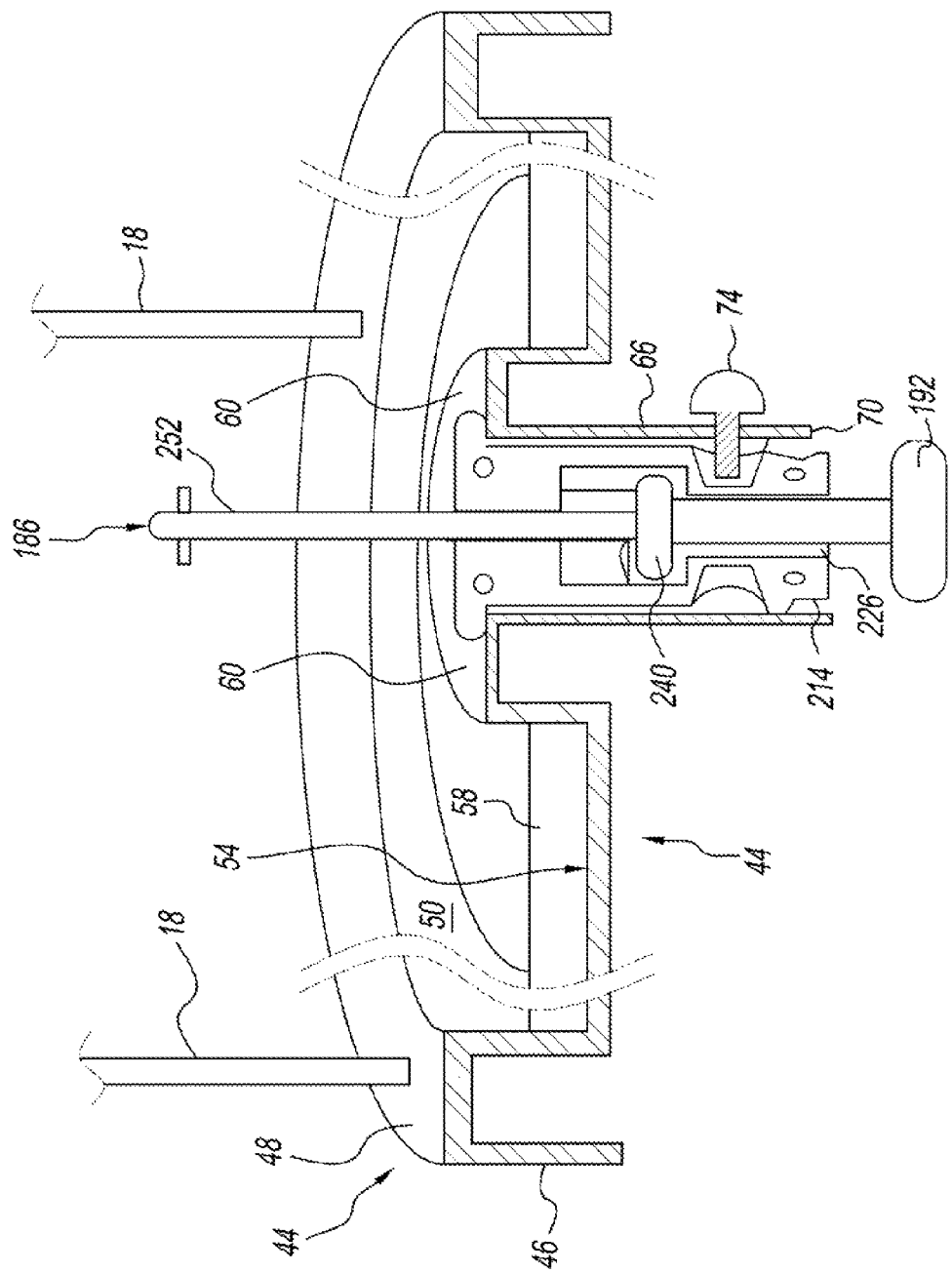

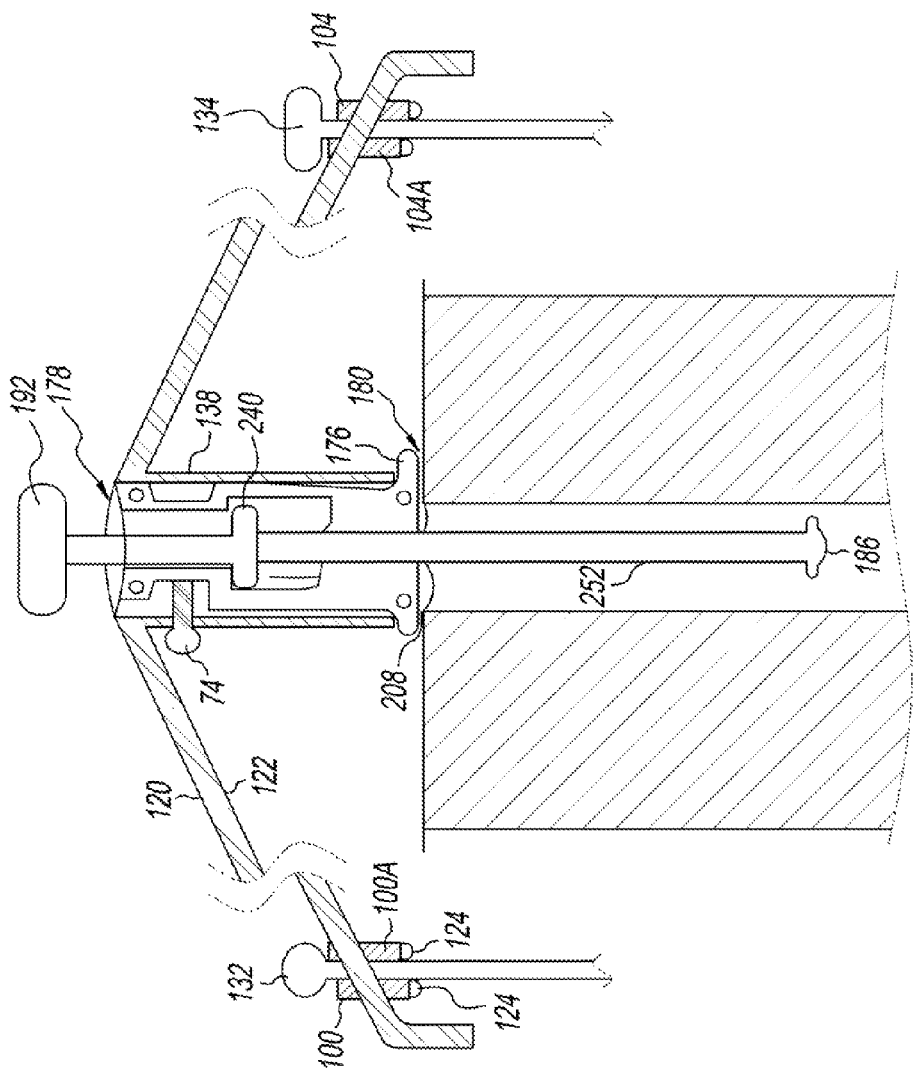

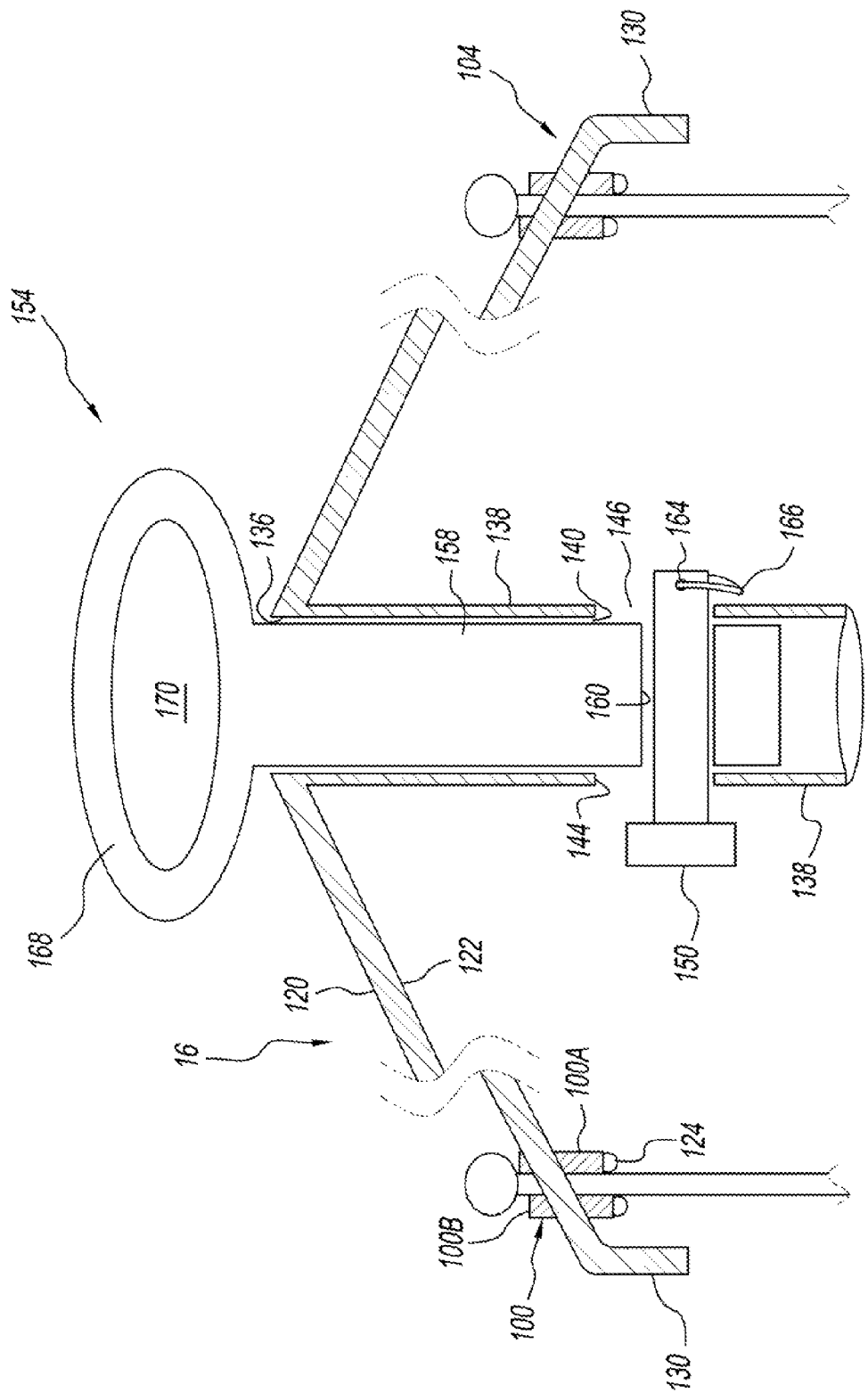

BIRD FEEDER

I. TECHNICAL FIELD OF THE INVENTION

The present invention relates to wild animal feeders, and more particularly, to a wild animal feeder that is especially adaptable for use with feeding wild animals such as birds, squirrels and small woodland creatures and also especially adaptable for use in connection with animal feeds that are formed into a feed block.

II. BACKGROUND OF THE INVENTION

Feeding wild animals, such as wild birds, squirrels and other small wildlife is a widely practiced hobby. Many people enjoy observing wild birds, and seek to attract them by providing feeding stations where the birds can obtain food. These feeding stations are especially helpful for birds and other wild life during the winter months and in colder climates where the animals energy needs are increased, and naturally occurring foods, such as plants, seeds and the like are often unavailable or in short supply. In this regard, food supplies can become especially limited when snow that covers many of the animals' food sources.

A large variety of bird and animal feeders exist currently. For example, Wild Birds Unlimited, Inc., of Carmel, Ind. offers for sale and displays many bird feeders at its website at www.wbu.com. A wide variety of other feeders are available through manufacturers such as Perky Feeders, and can be found at www.birdfeeders.com.

A typical bird feeder includes a frame that includes a hopper portion, a perch portion, and amounting portion. The perch portion often comprises a tray or bar on which a bird can perch while eating the bird food. The hopper usually includes a container for containing a loose packaged bird food. Most bird foods comprise things such as loose seeds, nuts, kernels, peanuts, raisins, fruit pieces, nut pieces and other items that birds find tasty nutritious and nourishing diet. Other loose foods for other wild animals, such as squirrels may include other seeds such as corn, or other food items.

The holder or mounting portion is a part of the feeder that the user employs to mount the feeder onto a suitable holder. One example of a suitable holder is the Advanced Pole System® brand bird feeder pole, that is sold by Wild Birds Unlimited, Inc., and is shown in Carpenter and Holscher et al., U.S. Pat. No. 6,386,142 (which is incorporated herein by reference). These holder portions of the feeder may comprise a ring or sling disposed at the top of the animal feeder that is sized and configured to be received by a rod, such as a shepherd's hook. Through placing a rod, rope, wire or cable through the hole, the bird feeder can be mounted to various hook members that can be mounted on the ground or onto a building, or alternatively, can be used to receive rope to enable the bird feeder to be hung from the branch of a tree.

As an alternative, some feeders are base mounted. In order to be mounted to a base, the bird feeder might include for example, a platform to which a metal base plate can be attached. The base plate may be formed as a part of a bird pole, or can be designed to include a ring or sleeve for receiving a pole or rod, such as the pole associated with the Advanced Pole System® type bird pole shown in the Carpenter and Holscher patent discussed above.

Most bird seed type bird and squirrel feeds are packaged loosely for placement in a container, such as a hopper to hold it until such time as the birds or other animals consume it from the feeding port of the container. However, not all seed is provided in a loose form. For example, it has been found by that birding enthusiasts that many birds enjoy having or eating a bird food that is presented in a block form such as suet.

Suet comprises a cake of hard fat mixed with seeds, grains, nuts and fruit that serves well as a food for birds. Typically, the fat is derived from the areas around the kidneys of cattle and sheep. Suet balls formed from this fatty material can be shaped into flat cakes, balls, plugs or novelty shapes such as wreaths, muffins or bells to be decorative, as well as nutritious for birds. Suet serves particularly well for birds in the winter, because the fat used to create the suet cakes is a highly concentrated form of energy that is important to help the birds maintain body heat.

Because of its cake-like nature, suet is not placed in a hopper type feeder. Rather, suet can be placed on a stand-type feeder. Wild Birds Unlimited, Inc. and other companies sell cage-like devices into which a suet cake can be placed. The cage like device can be hung on a feeder pole. The wire of the cage can serve as a perch hold for birds, and the spaces between the wires can provide areas wherein the birds insert their beaks to access the suet that is contained within the cage.

Another type of recently introduced animal feed comprises bird food that is provided in the form of a food block. These food blocks often include a plurality of seeds and other type foods that are held together with a binder to form a block. Often, the block is a ring like block that takes the shape of a cylindrical or rectangularly cuboid ring. Regardless of the shape, many such blocks include axially extending passageways.

Food blocks having such passageways are particularly well adapted for use with hopperless bird feeders. Hopperless bird feeders do not include hoppers or cages for containing and holding seed, but rather include a shelf of some sort upon which the food block can rest. To maintain the food block on the shelf, an axially extending rod is provided that is sized, positioned and configured for extending axially through the axially extending passageway of the food block. As such, the axially extending rod captures food block and maintains the food block upon the shelf of the feeder.

Over time, the birds eat at the exterior surfaces of the food block, eating through the food block to the point wherein all of the seed (and other food items) are fully consumed by the birds.

In some cases, the food block may be formed to include a liner for the passageway (that is functionally similar to the cardboard roll of a toilet paper roll), to help to prevent the centrally disposed rod from chipping away at the layers of food that define the walls of the cylindrical passageway.

Although such food blocks are very convenient to use, they do have certain drawbacks. In particular, the feeders that are used with such food blocks have designs that often make changing or replacing food blocks more complicated than necessary in order to change food blocks. In particular, since the axially extending rod that secures the food block extends upwardly from the shelf (or downwardly from the roof), a sufficient distance to maintain the food block on the shelf, it is often difficult to replace a new food block onto a shelf when the prior food block is fully consumed. Difficulty exists because in order to place the new food block on the shelf, one must remove the axially extending rod, so that the food block can be moved laterally on the shelf into a position wherein the axially extending rod is aligned with the axially extending passageway so that the rod can be extended through the axially extending passageway.

In conventional known "food block" bird feeders, moving the rod to a position wherein the new food block can be placed on the shelf requires the user to either dis-assemble the roof of the bird feeder from the remainder of the bird feeder unit; or alternately, to remove the base of the bird feeder from the remainder of the unit, so that the open end of the passageway within the bird food block can be aligned with, and positioned co-linearly with the rod at its exposed end, and then moved axially over the rod. After this occurs, the base or roof is then reconnected to the remainder of the bird feeder.

Although such a device performs its function well, room for improvement exists. En particular, room for improvement exists in providing a bird feeder that permits a more quick and easy replacement of a bird food block on a bird feeder of the general type described above.

One object of the present invention is to provide such a device.

III. SUMMARY OF THE INVENTION

In accordance with the present invention, a wild animal feeder is provided for holding a food block having a passageway therein. The feeder comprises a base member and a roof member. The base and roof members define a food receiving space there between for receiving a food block. A food block engaging member has a proximal end and a distal end. A food block engaging member coupler is provided that is attached to one of the base member and roof member for coupling the food block engaging member to one of the base member and roof member for permitting the food block engaging member to move between a food block engaging position and a food block release position. In the food block engaging position, the food block engaging member is positioned in the food receiving space between the roof and base member to engage the food block for maintaining the food block on the feeder on the food receiving space. In the food block released position, the food engaging member is positioned to permit the food block to be inserted into the food receiving space.

In a preferred embodiment, the food block engaging member comprises a rod that is sized and configured for being received within a passageway in the feed block. Additionally, the food block engaging member comprises a rod coupler, with the rod coupler including an axially extending passageway for slidably receiving the rod.

In a most preferred embodiment, the locking member includes a transversely disposed locking member that is coupled to the rod member. The locking member has a greater length dimension than width dimension. Additionally, the coupler preferably includes an axially extending passageway that includes a distal portion having a first cross sectional area, a proximal portion having a second cross sectional area different from the first cross sectional area, and a central portion having a third cross sectional area that is different from each of the first and second cross sectional areas.

The first cross sectional area of the distal portion is preferably sized for slidably receiving the rod, while preventing the locking member from moving there through, and the second cross sectional area of the proximal portion is larger than the first cross sectional area. The second cross sectional area of the proximal portion is sized and shaped for permitting the locking member to pass there through. The second cross sectional area while large enough for permitting the locking member to pass there through is preferably small enough to prevent the rod to rotate more than about 40 degrees (and preferably no more than about 10 degrees) when the locking member is in the proximal portion of the axially extending passageway.

The central portion has a cross sectional area greater than the distal portion and also includes a proximal section and a distal section. The distal section of the central portion is sized and configured to permit the locking member and the rod to rotate, to thereby permit the locking member to rotate between a released position wherein the locking member is positioned to pass through the proximal portion and out of the coupler, and a locked engaged position wherein the locking member has rotated to a position where it can move into the proximal section of the central portion where it will rest in the proximal section, to thereby maintain the rod locked in the food engaging position.

One feature of the present invention that the base and roof both include coupler receiving apertures, and that the rod coupler can be coupled to either of the base member aperture and roof aperture. Concurrently, the open aperture can be used for receiving a support engaging member, such as an eyelet, hook, base member or the like, that enables the feeder to be coupled to a support member, such as a bird pole, shepherd's hook, tree, deck cart or the like.

This feature has the advantage of making the device more universally adaptable to various mounting situations. As discussed in the background, some people prefer to mount the bird feeder by connecting the feeders with a rope to tree branch. In this configuration, the coupler and rod may be coupled to the aperture in the base member, with a supporting engaging member such as an eyelet containing plug being coupled to the top (roof) aperture member. A rope, wire or rod can then be extended through the eyelet, to couple the bird feeder to a tree branch.

Alternately, the rod coupler can be engaged in the roof aperture member and extended downwardly into the food block. In such case, the bottom aperture may then receive the support engaging member, that could include a sleeve that is insertable into the aperture, that is coupled to a planar base member. The planar base member may include such things as fastener receiving apertures through which screws can pass for fastening the feeder onto a wooden structure such as a deck, swing set, post or the like. Additionally, the base member can be provided with a sleeve that enables the base member to be coupled to a support such as a pole.

One feature of the present invention is that the coupling member includes a food engaging rod that is movable between a food bock engaging position and a food block release position. Through this, the rod can be moved into a food engaging position to maintain the food appropriately on the bird feeder. However, when the time comes to replace the bird food block, the rod can be moved to the food block release position that permits enough space to exist between the base and the roof members to enable another food block to be moved laterally onto the base, to a position wherein the rod can then be inserted into the axially extending passageway of the new food block. The rod can then be moved axially to be inserted into the interior passageway to engage the new food block. Through this arrangement, bird food block refills can be placed onto the bird feeder without the need to disengage either or both of the roof and base from the remainder of the bird feeder.

These and other features of the present invention will become apparent to those skilled in the art upon a review of the best mode of practicing the invention perceived presently by the inventor, which is described below in the specification and shown in the attached drawings hereto.

IV. BRIEF DESCRIPTION OF DRAWINGS

FIG. 4 is a side, partially exploded view of the device of the present invention showing the food block engaging mechanism as being separated from the remainder of the housing of the bird feeder;

Figure 8:
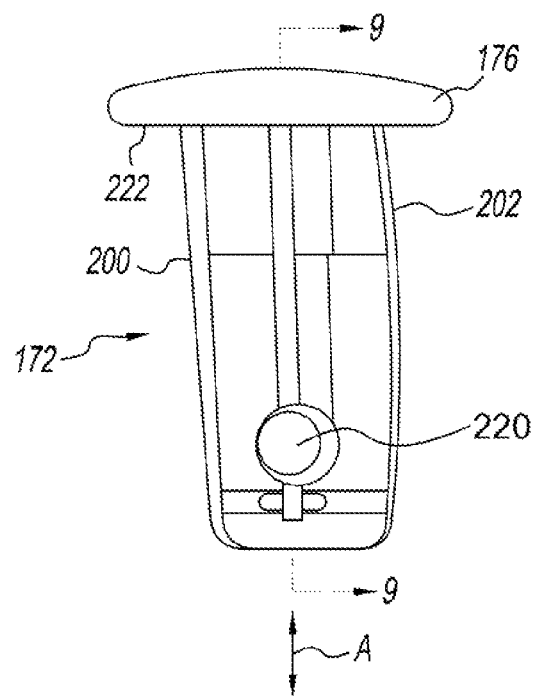
FIG. 8 is a side view of the food block engaging member coupler of the present invention that is employed for coupling the food block engaging member rod to the bird feeder housings.
Figure 9:
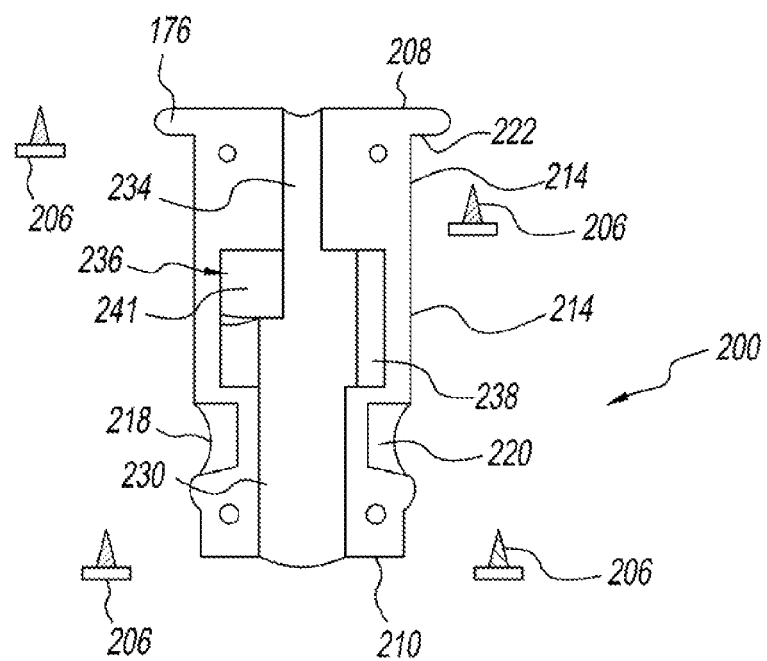
Figure 10:
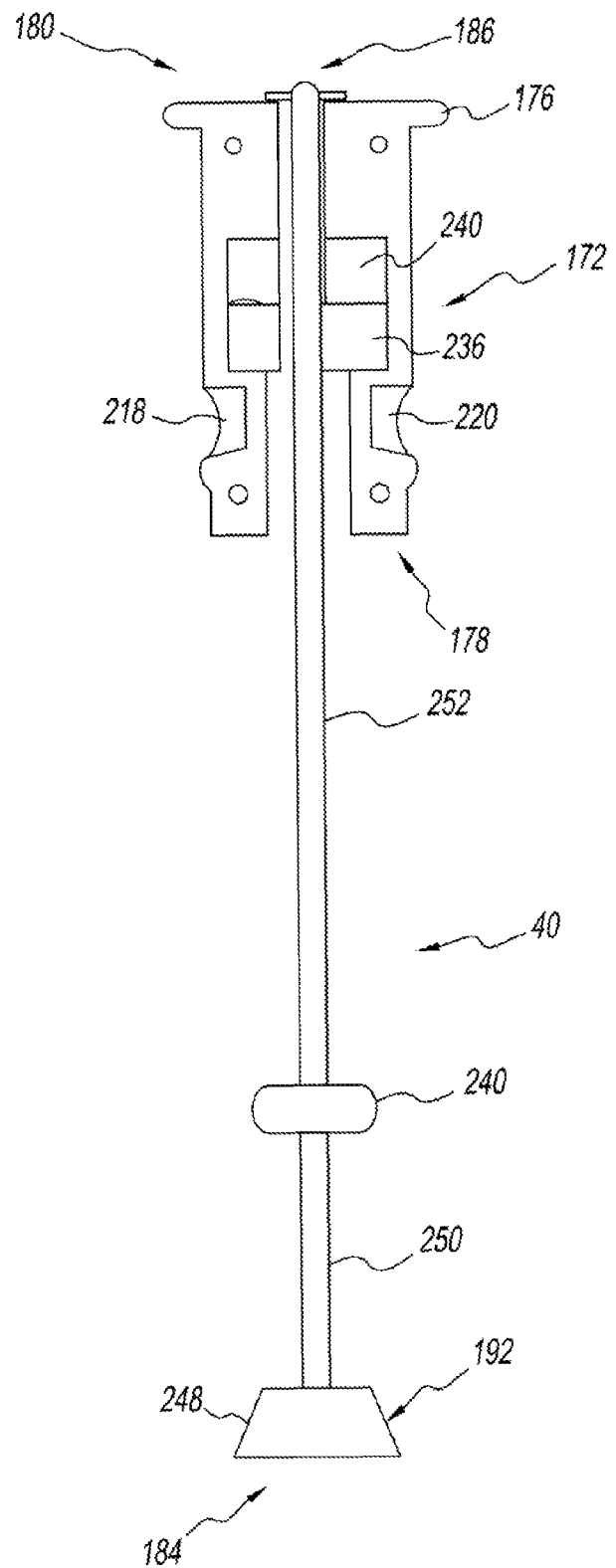

FIG. 9 is a side view of one piece of the two-piece coupler member shown in FIG. 8. As will be described below, the coupler member comprises two half members (pieces) that are assembled together with screws. As such FIG. 9 comprises the functional equivalent of a sectional view of the coupler of FIG. 8 wherein the coupler of FIG. 8 is sectioned on a plane denoted by lines 9-9 of FIG. 8 that includes the longitudinal axis of the coupler of FIG. 8;

FIG. 10 is a side view of the coupler member half into which the rod of the food block engaging member is inserted and placed in the disengaged position;

FIG. 11 is a side, quasi-sectional view showing the rod mechanism and coupler member half, wherein the rod member is placed in a position so that it is axially moveable in the axially extending passageway and the coupler for passage through and out of the proximal portion of the axial passageway;

FIG. 11A is sectional view taken along lines 11A-11A of FIG. 11

Figure 1:
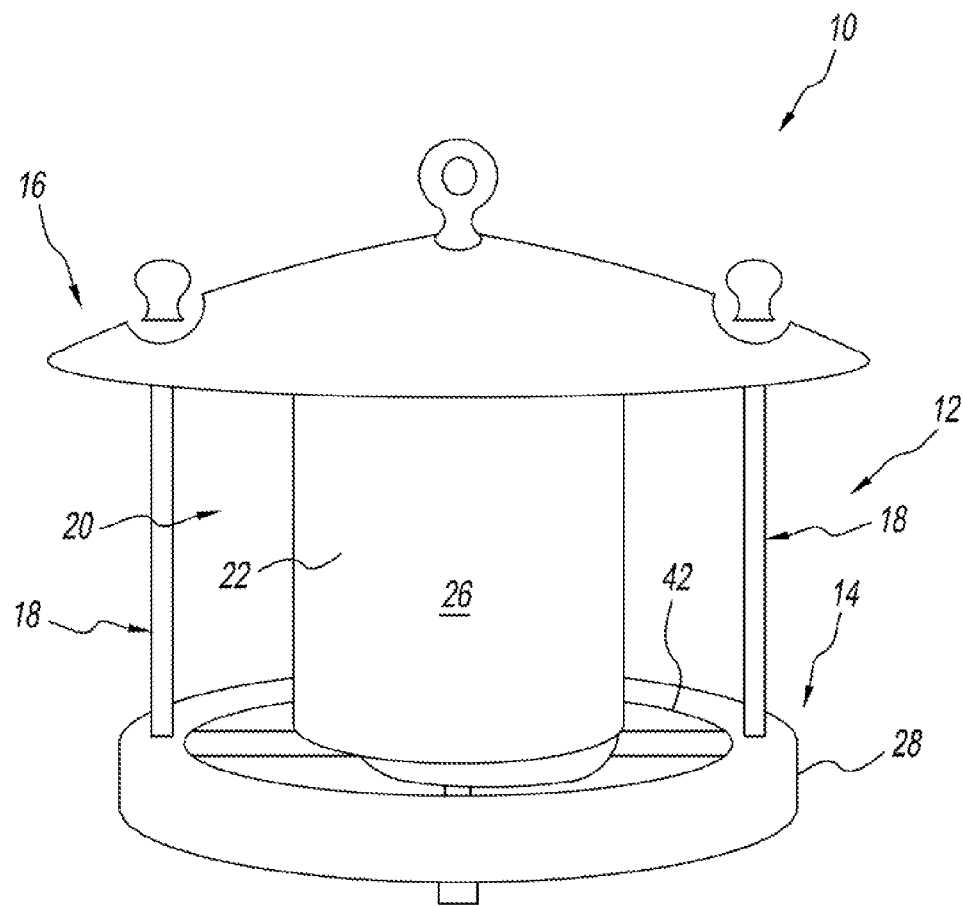
FIG. 1 is a side perspective view of the bird feeder of the present invention, showing the bird feeder with a feed block of wild animal food, such as bird feed installed therein.
Figure 2:
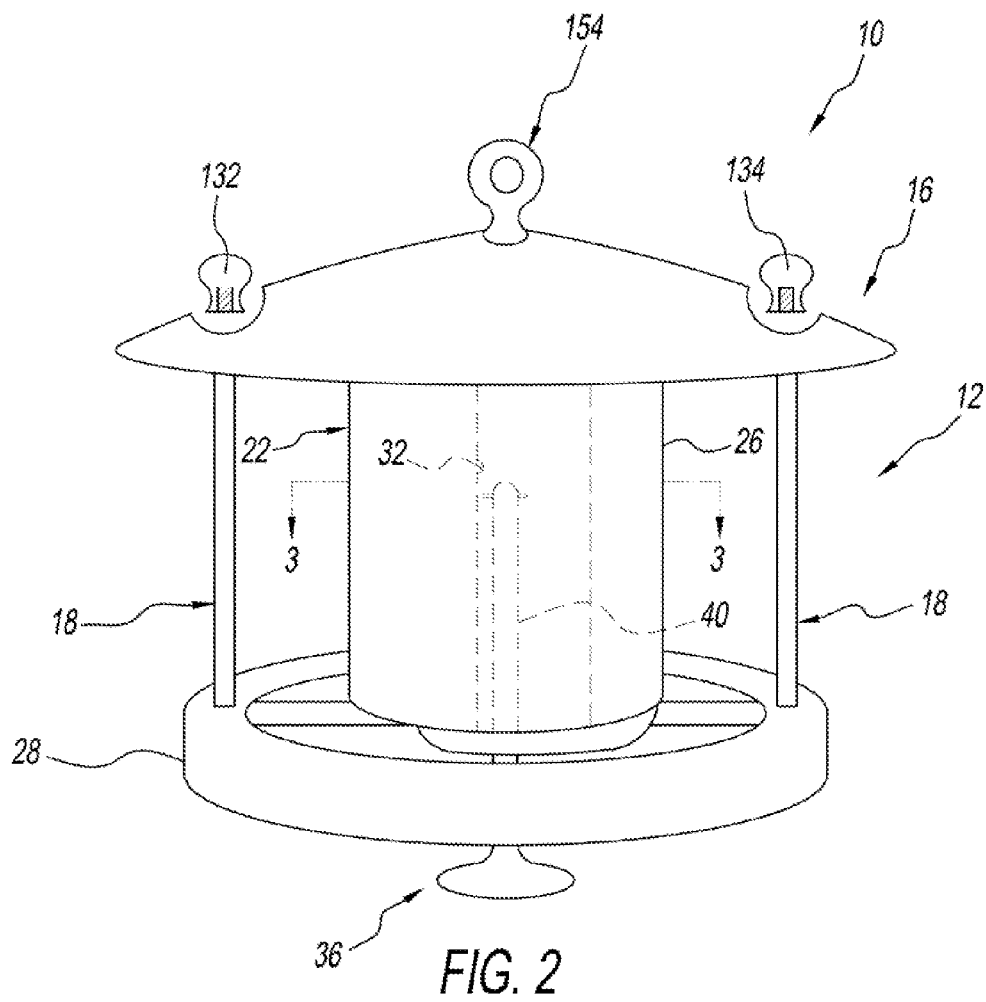
FIG. 2 is a side view, generally similar to FIG. 1, showing the food block engaging member rod in the food block engaged position in phantom.
Figure 14:
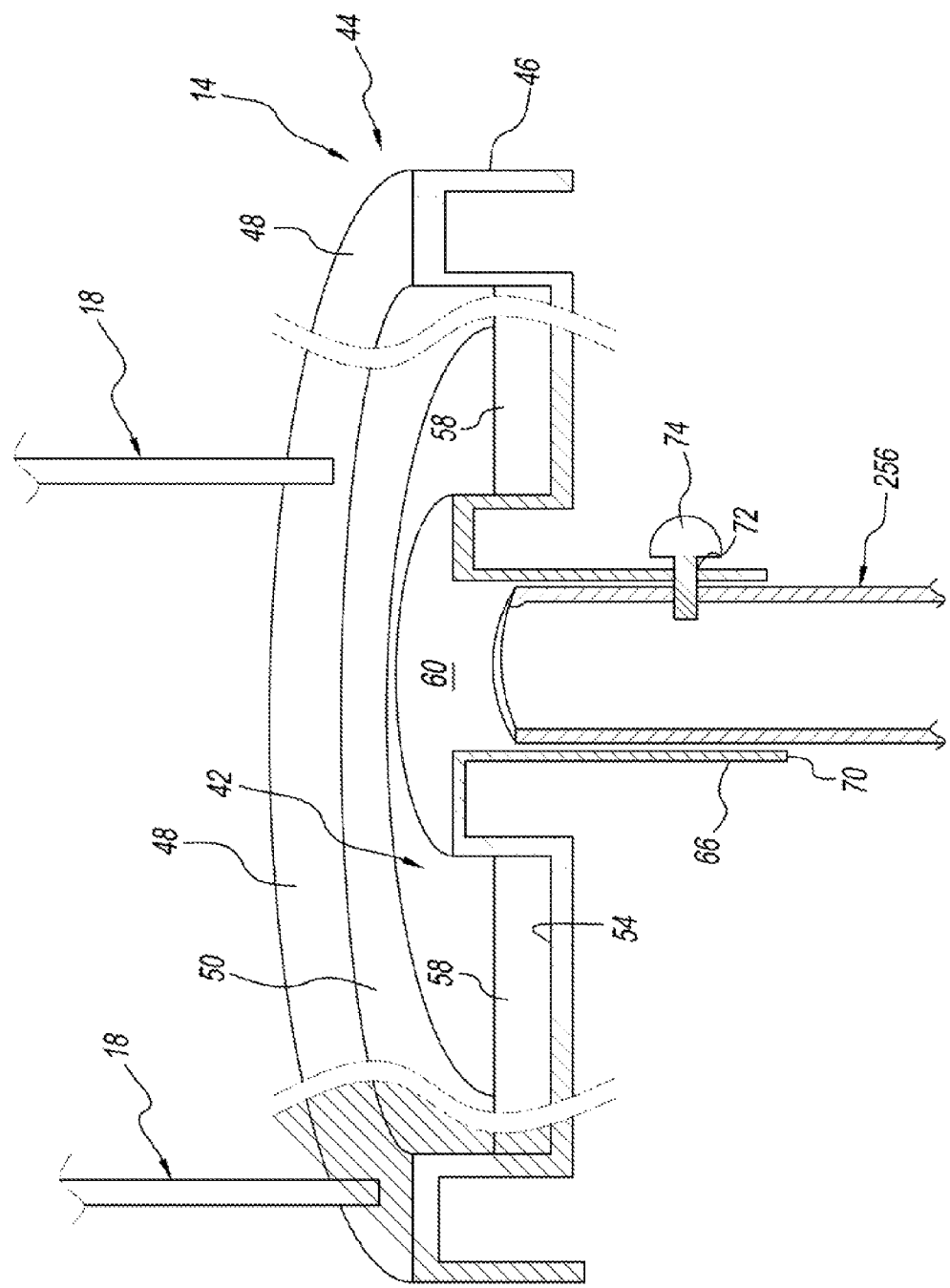
Figure 15:
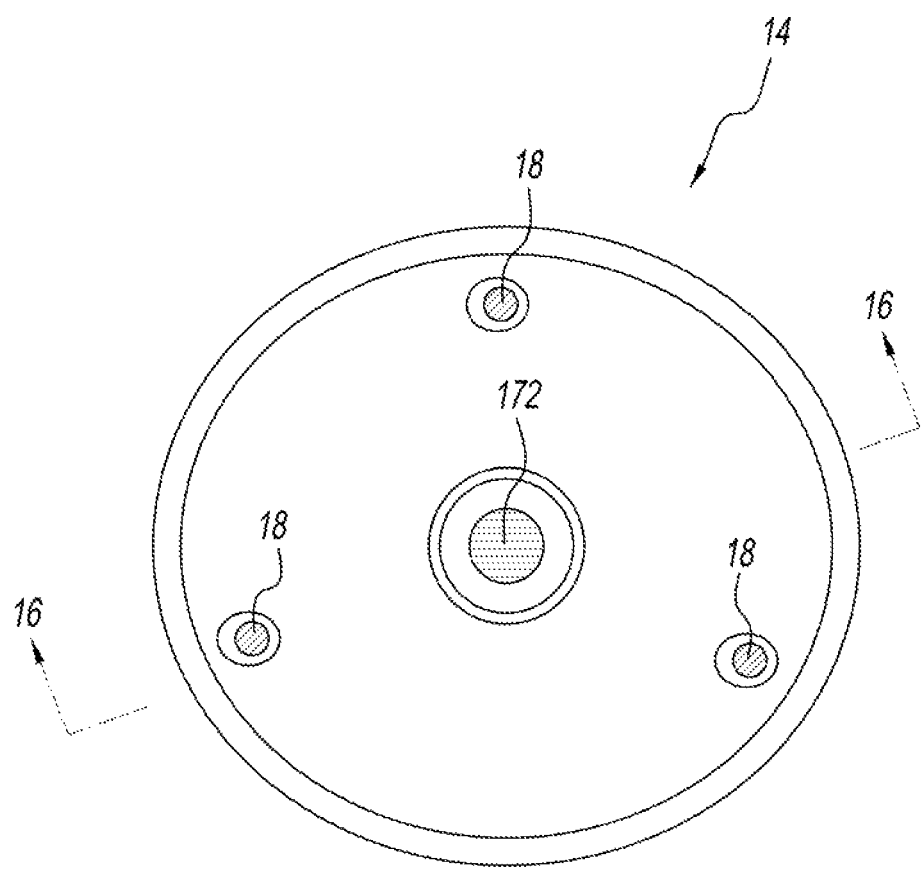

FIG. 12 is a side view of the food block engaging mechanism of FIG. 11, wherein the rod member is shown in the "locked" position where axial movement of the rod in the axially extending passageway of the coupler is prevented to thereby maintain the rod in the food block engaging position;

FIG. 13 is a partial sectional view of the base of the bird feeder, showing the food block engaging member and rod inserted into a centrally disposed axially extending sleeve that is formed in the base member of the device housing, so that the rod member may extend upwardly from the base member toward the roof member of the bird feeder;

FIG. 14 is a sectional view of the base member, similar to FIG. 13, wherein the food block engaging member and coupler has been removed from the sleeve and replaced with an axially extending tube of a mounting pole, to illustrate the feed mounted on a ground engaging pole, rather than being hung from above by a shepherd's hook as is shown in FIGS. 1 and 2;

FIG. 15 is a sectional view taken from the underside surface of the roof member of the feeder of the present invention;

FIG. 16 is a sectional view of the roof member of the present invention, showing the food block engaging member coupler being coupled to a bird feeder roof so that it is received within an axially extending, centrally disposed tube member of the roof, and showing the rod member in the food engaging position extending through the axially extending central passageway of the food block; and FIG. 17 is a side sectional view, similar to FIG. 16 wherein the food engaging mechanism has been removed from the central aperture, so that it is in a position for receiving a hanger plug.

V. DETAILED DESCRIPTION OF THE PREFERRED EMBODIMENT

The present invention relates to a bird feeder 10 that is shown in the figures. Within this application, terms such a radial, axial, upper and lower will be used. It is to be understood that these are not terms of limitation, but rather terms of description, to help describe relative positions of components, and to provide some differentiation between the names of the components. For example, the term radial could be read broadly enough to include such terms as chordal or the like, and to also include lines having axes that are not truly either horizontal or vertical, but may be within a range of vertical or horizontal.

Turning first to FIGS. 1-5, the primary components of the feeder 10 include a feeder housing 12 that includes a base member 14, a roof member 16, and three upright support members 18 that connect the roof member 16 to the base member 14, and position the roof member 16 and the base member 14 in a spaced relation to define a food receiving space 20 there between. A food block 32 shown in FIG. 1 can be placed into the food receiving space 20 that is defined between the base member 14 and the roof member 16.

The volume and height of the food receiving space 20 between the base member 14 and the roof member 16 can be varied by varying the length of the support members 18. The size of the food block 22 that is placed in the food receiving space 20 should be chosen so as to fit both from a length perspective, and also from a width (diameter) perspective.

As the base member 14 serves as a perch upon which the birds may sit during feeding, the food block 22 should have a diameter, such that its radial outwardly facing surface 26 is spaced at an appropriate distance from the radially outward perimetral edge 28 of the base to provide sufficient room between the food block 22 and the perimetral edge 28 of the base 14 to enable a bird to perch comfortably thereon, and still be able to feed on the food block 22. Because of the positioning of the food block 22, it is envisioned that most birds will perch on the bird feeder 10 so that the bird is positioned, head to tail, in a generally radial direction, with their tails extending radially outwardly and their heads extending radially inwardly so that they can place their heads adjacent to the food block 22 to use their beaks to remove seeds and other food stuffs from the food block 22.

Figure 3A:
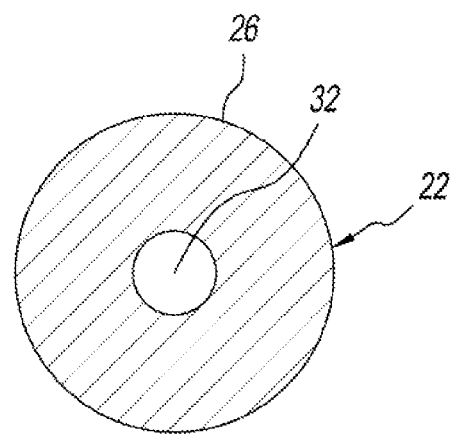
FIG. 3A is a sectional view taken along lines 3A-3A of FIG. 2A.
Figure 3:
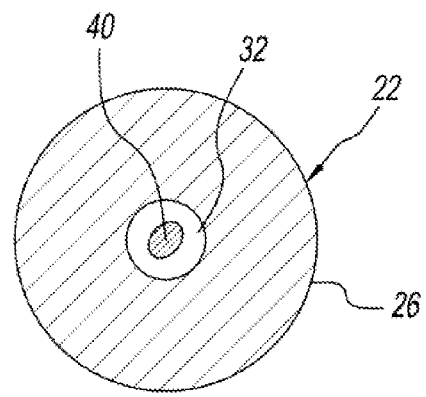
FIG. 3 is a sectional view taken along lines 3-3 of FIG. 2.
Figure 2A:
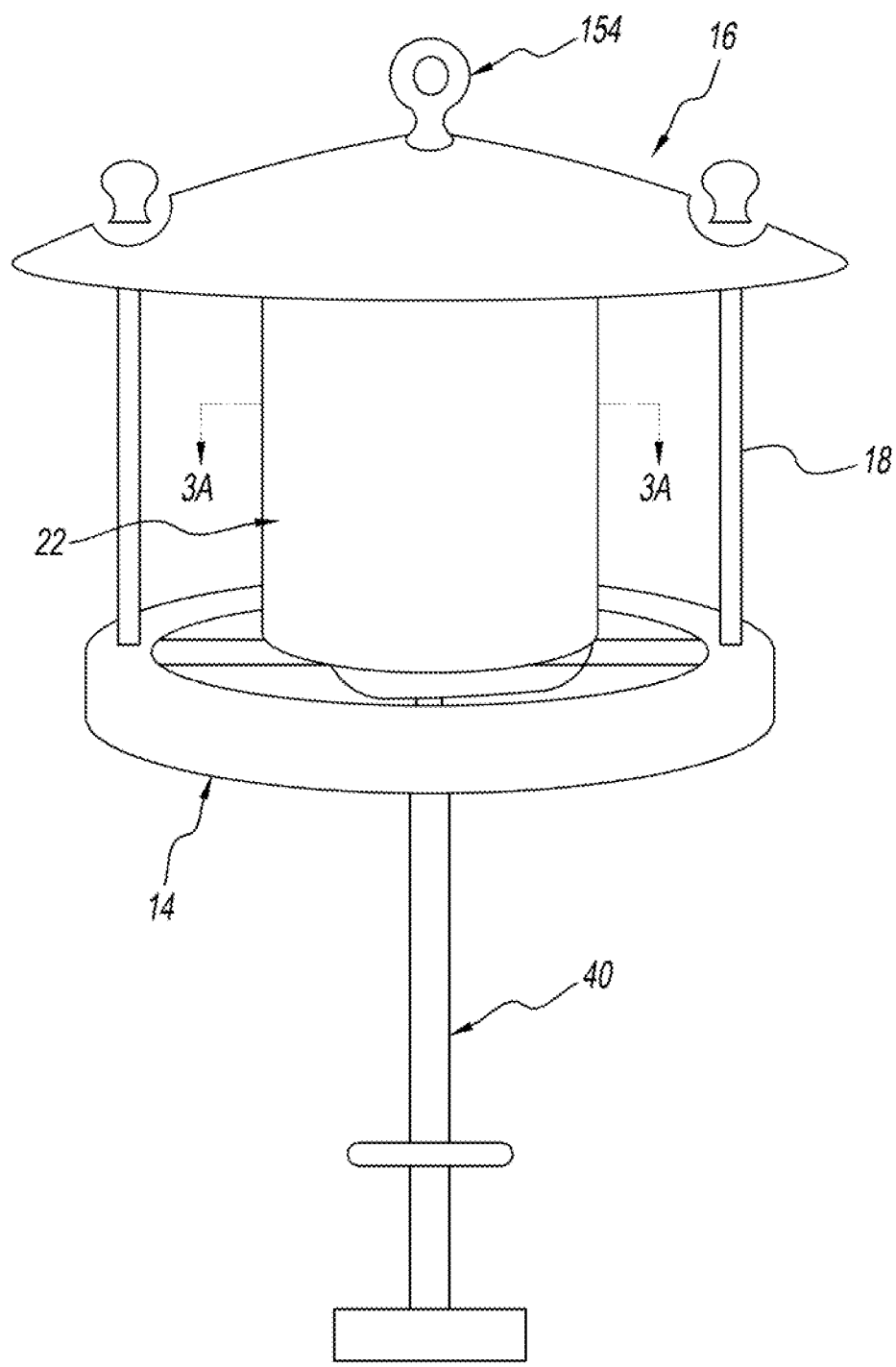
FIG. 2A is a side view of the feeder of the present invention, similar to FIG. 2, except showing the bird food block engaging rod in the food block release position to facilitate installation of the food block onto the bird feeder and removal of the food block from the bird feeder.
Figure 5:
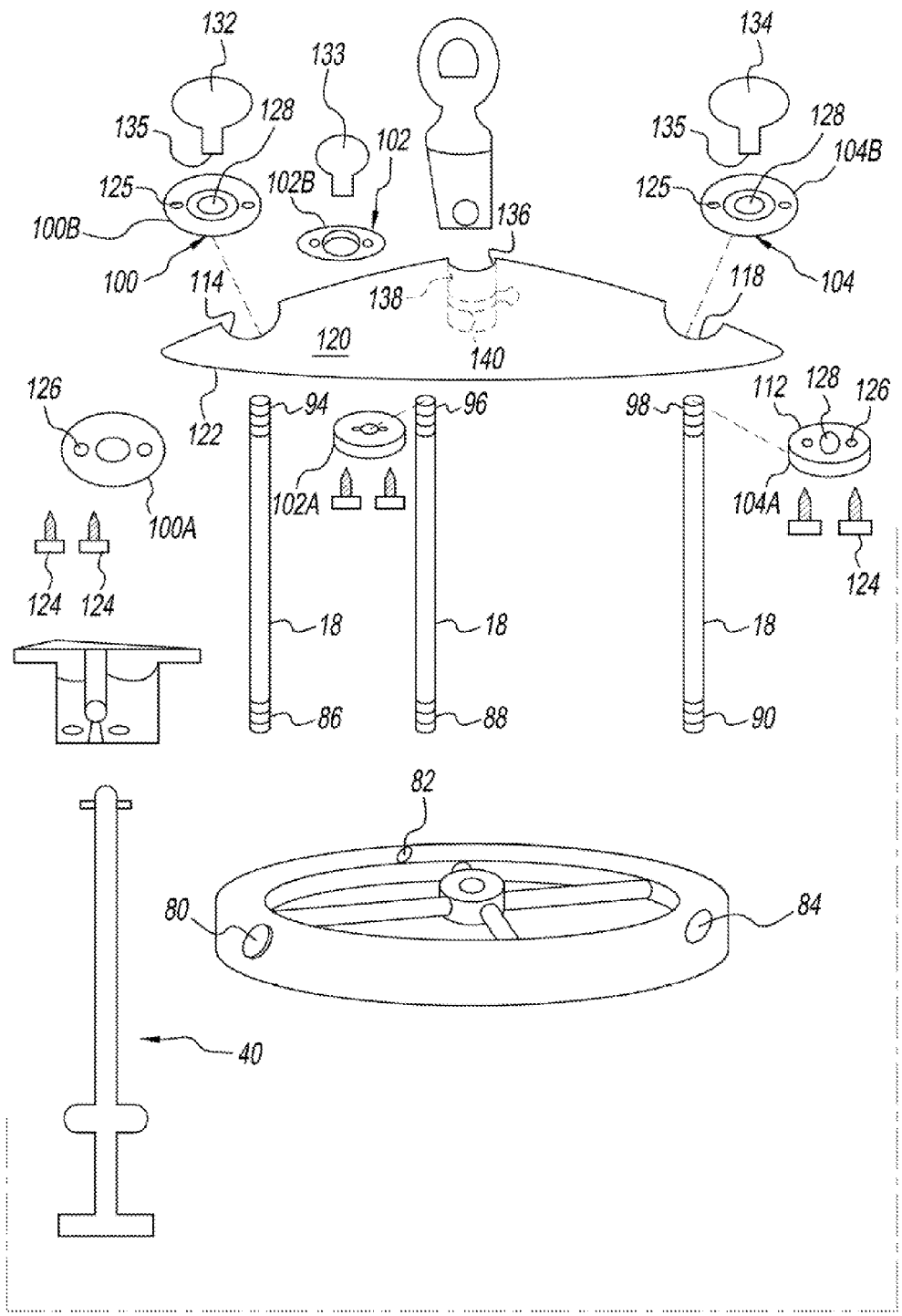
FIG. 5 is an exploded view of the present invention.
Figure 6:
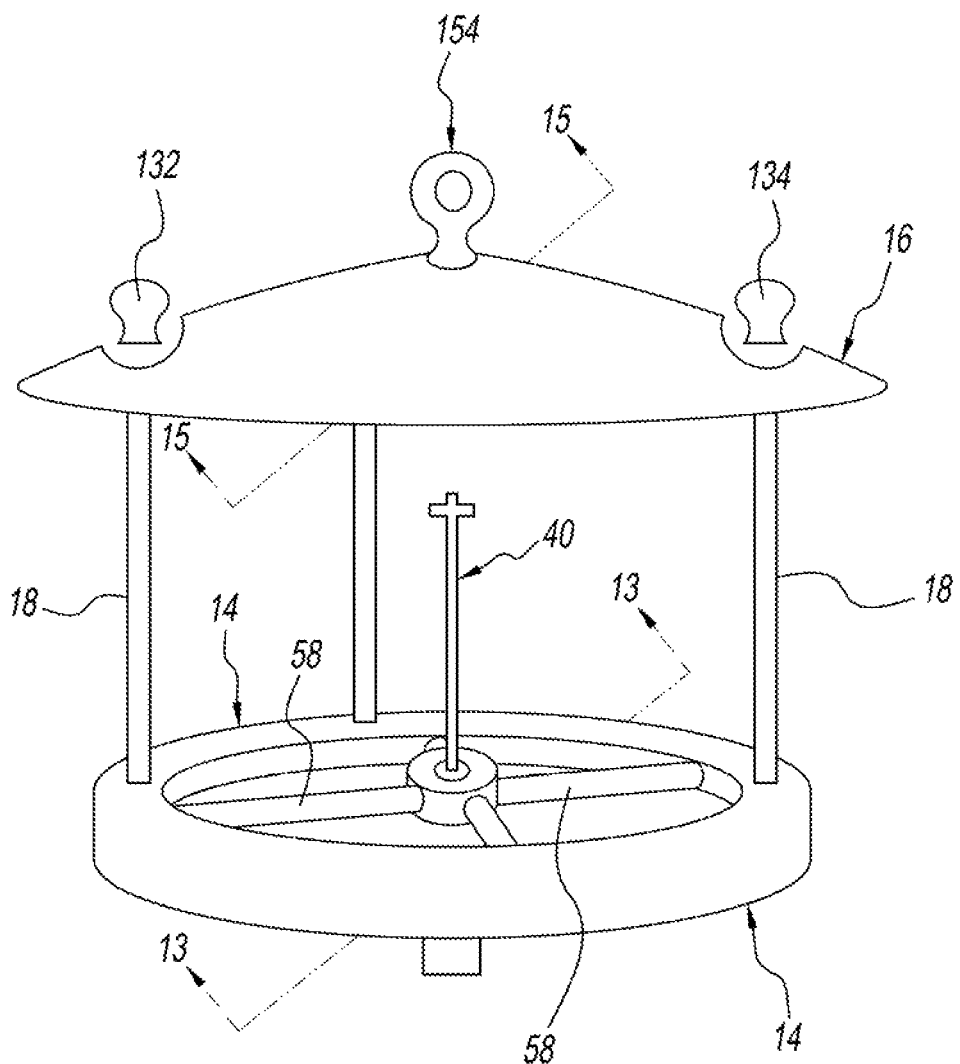
FIG. 6 is an assembled view of the present invention, showing the bird food block engaging member including the engaging rod and rod coupler being coupled to the remainder of the bird feeder, but showing the seed containing food block removed therefrom.

As best shown in FIGS. 3 and 3A, the food block 22 is designed to be generally cylindrical and tubular and include an axially extending central passageway 32 through the center of the food block 22. The central passageway 32 of the food block 22 is designed to enable the food block engaging member 36, and in particular, the rod member 40 of the food block engaging member 36 to be inserted coaxially within the passageway 32 to secure the food block 20 on the upper surface base of the bird feeder 10 and prevent the food block 22 from falling off of the bird feeder 10. Although the food block 22 is shown as being cylindrical, the food block 22 may bear any one of a variety of other shapes. For example, the food block 22 may be rectangularly cuboid, triangularly wedge shaped, or otherwise have a cross sectional shape that is limited only by the imagination of the user, such as having an ovaloid, pentagonal, hexagonal, octagonal, star-shaped, quadrilateral shape or even a snowman shaped cross sectional area.

As best shown in FIG. 4, the food block engaging member 36 can be decoupled from and coupled to the housing 12 of the bird feeder 10. Additionally, the food block engaging member 36 can be coupled to the base 14 to enable the rod 40 to extend upwardly from the base 14 of the bird feeder 10, as shown in FIGS. 1, 2 and 2A and FIG. 13 or alternately, can be coupled to the roof member 16 so that the rod 40 of the food engaging member 38 extends downwardly from the roof 16, as is shown in FIG. 16.

Returning back to FIGS. 1-5 and 13, the bird feeder 10 of the present invention is comprised, in a preferred embodiment, of a plurality of components. The base member 14 is generally shelf-like, and include an upper surface 42 and a lower surface 44. A circumferential raised rim 44, extends around the radially outward perimeter of the base member 14, and includes a radially outwardly facing surface 46, and an axially upwardly facing surface 48.

A radially inwardly facing surface 50 of the raised perimetral rim 44 helps to define a relatively depressed shallow bowl-like middle, torus-shaped tray portion 54 of the base member 14. En the embodiment shown, four radially extending stiffening members/compartment dividers 58 extend between the perimetral rim 44, and the raised central portion 60 of the base member 14. The radially extending stiffening members 58 both help separate the upper surface 42 tray portion 54 base into four separate dish-like compartments, and also provide additional structural rigidity for the base 14.

Having the base 14 tray portion 54 divided into four cavities can be useful, if the user intends to use the cavities of the tray portion 54 for storing food that is in addition to and/or different from the food contained in the food block 22. As the base is separated into various cavities, the user can store four different types of food while maintaining some separation between the foods. For example, one of the cavities could be used to store water, and separate the water from a dry food (e.g. thistle seed) that was stored in an adjacent cavity.

Additionally, when the food block 22 is used, the cavities provide a food catcher. Birds are notoriously sloppy eaters, and in the course of eating, often cause various seeds and other food particles to become dislodged from the block without being consumed as the birds often keep pecking at the block to obtain a more favored food. The upper surface 42 of the base member 16, and in particular, of the four cavities of the tray portion 54 formed therein, can help to catch their seeds that fall from the food block 22 or that otherwise are torn away or deposited by birds. Additionally, the raised perimetral lip 44 can serve as a grabable, talon-engagable perch by birds.

The central portion 60 of the base 14 is raised relative to the tray portion 54 cavities and generally has the same height as the raised perimetral lip 14. An aperture 64 is disposed at the center of the central portion 60. This aperture 64 comprises the upper open end of an axially extending cylindrical tube 66. This cylindrical tube 66 is best shown in FIGS. 13 and 14 and extends at its upper end, to the upper surface 42 of the central portion 60 base portion 14, and extends at its lower end 70, below the level of the lower surface 44 of the base portion.

Preferably, the cylindrical tube 66 is approximately 2 inches (5.08 cm) in length, and has a diameter that is sized to interiorly receive a standard size bird pole, such as the bird poles used in connection with the Wild Birds Unlimited Advanced Pole System® that is shown on www.wbu.com. A radially extending threaded aperture 72 is formed in the lower portion of the cylindrical tube and is provided for receiving a retaining screw 74. The retaining screw 74 can be threadedly engaged into the aperture 72 so that the distal end 73 of the screw engages either the food block engaging member 36 (FIG. 13) or alternately, a support pole 76 (FIG. 14) to help maintain the coupling between the base 14 of the bird feeder 10, the bird pole 76 or food block engaging coupler 36 that is inserted within the cylindrical base rube 66.

The upper surface 48 of the perimetral lip includes three threaded apertures 80, 82, 84 for receiving, respectively, the three threaded lower ends 86, 88, 90 of the respective support rods 18, that connect the base member 14 to the roof member 16. The three support rods 18 can be of any desired length, but in a preferred embodiment, are approximately 12 inches in length. The support rods 80 each also include upper threaded ends 94, 96, 98 for engaging threaded grommets 100, 102, 104 that are inserted into apertures 114 (not shown), 118 formed in the roof member 16.

In the drawings, the grommets 100, 102, 104 are shown as two piece grommets, where one grommet half 100B, 102B and 104B of each grommet is placed over the upper surface 120 (See FIG. 16) and a second grommet half 100A, 102A, 104A is placed adjacent to the lower surface 122. Screws 124 are extended through threaded apertures 125, 126 in the grommets 100B, 100A, 102B, 102B, 104B and 104A for fixedly coupling together the grommet halves 100B, 100A; 102, 102A; and 104 B, 104A.

If so desired, reinforcing bracket members (not shown) that may be similar to grommets 100, 102, 104 can be coupled to the underside surface of the base member 14, so as to provide a better threaded surface for the threads 86, 88, 90 of the support rods 18 to engage, so as to more effectively and securely couple the support rods 18 to the base member 14.

The roof member 16 is generally formed of a sheet metal material, and is generally frusto-conical in shape to provide a raised sloping roof having its apex at the center. An axially extending, down-turned flange 130 (FIG. 12) is disposed at the radially outward perimeter of the roof 16 and extends completely around the roof 16.

Three rod receiving apertures 114, (not shown) 118 extend through the roof member 16 and are each disposed approximately 60° apart, and approximately 1 inch from the radially outward edge (flange 130) of the roof member 16. The apertures 114, (not shown) 118 are sized for receiving to reinforcing grommets 100, 102, 104 therein. Each of the grommets 102, 104, 106 includes an upper grommet member 100B, 102B, 104B that is disposed adjacent to the upper (outer) surface 120 of the roof 116 and a lower grommet half 100A, 102A, 104A, that is disposed adjacent to the inner (under) side surface 122 of the roof.

Each of the grommets 100-104 includes first and second apertures 125, 126 for receiving small screws 124, for coupling the underside grommet member 100A, 102A, 104A to the upper side grommet member 100B, 102B, 104B. Preferably, the apertures 125 of the upper side grommet member 100B, 102B, 104B are threaded blind apertures, so that the screws 124 do not extend through the upper surface of the upper grommet members 100B, 102B, 104B and thereby detract from the aesthetic appearance of the device 10. As wood type screws 124 can be used, and as the grommets 100, 102, 104 are preferably made from a plastic material, the blind apertures of the upper grommet members 100B, 102B, 104B need not be threaded. Rather, the apertures 125 can be sized to be slightly smaller than the diameter of the screws 124, so that the screws 124 can "self-tap" the screw receiving apertures 125 of the grommet upper members 100B, 102B, 104B, in much the same way that a wood screw self-taps a wood piece into which it is inserted.

Each of the grommet members 100, 102, 104 include a threaded support rod receiving aperture 128. The threaded support rod receiving aperture 128 is sized and configured to receive the threaded upper ends 94, 96, 98 of the support rods 18. Preferably, the support rod receiving apertures 128 of the grommet member should be sized and configured so as to be large enough to slidably receive the threaded upper ends 94, 96, 98 through the apertures 128, since the apertures 128 do not secure the rods 18 to the roof member 16.

Three cap retainers 132, 133, 134 are provided that include a female threaded interior passageway 135 for interiorly threadedly receiving the respective threaded upper ends 94, 96, 98 of the rods 18, for securely and fixedly coupling the roof member 16 to the rods 18, and, hence to the base member 14.

A central aperture 136 is disposed at the center (peak) of the roof member 16. The central aperture 136 comprises the upper end of an axially extending, generally cylindrical tube 138 that includes a central passageway 140. The central tube 138 and passageway 140 extend axially downwardly from the underside surface of the roof member 16 to which the tube 138 is attached. The cylindrical tube member 138 has a diameter that is generally similar to the diameter of the cylindrical tube 66 that is coupled to the underside of the base member 14, although the cylindrical tube 138 of roof 16 may have a length that is slightly shorter than the tube 66 that is coupled to the base member 14.

The cylindrical tube 138 also includes a pair of aligned, radially extending apertures 144, 146 through which a pin 150 can be passed for securing a roof plug 154 into the central aperture 136 and passageway 140, as shown in FIG. 17.

A roof plug 154 can be inserted into the central passageway 140. The roof plug 154 includes a lower portion 158 that is sized and configured for insertion into the central passageway 14 of tube 138 of the roof member 16. The plug member 154 includes a radially extending passageway 160 that can be aligned with the radially extending apertures 144, 146 of the central tube 138, to enable the pin 150 (FIG. 17) to be extended through both the radially extending apertures 144, 146 of the cylindrical tube 138, and the radially extending passageway 160 of the plug 154 to secure the food plug 154 to the roof member 16. The pin 150 itself may include a radially extending passageway 164 positioned near the distal end of the pin 150 through which a retaining pin (such as a cotter pin or ring 166) can pass for securing the pin 150 into the central passageway 140 of the plug 154 and cylindrical tube 138.

The upper portion of the plug 154 preferably includes a loop member 168 having a central aperture 170. The central aperture 170 of the loop member 168 should be sized and configured to be received by a mounting member (not shown). This mounting member can take the form of a hook member of a shepherd's hook type mounting member. Examples of such Shepherd's hooks are shown in Carpenter and Hoscher, U.S. Pat. No. 6,386,142.

Alternately, the mounting member can take the form of a rope or cable that is passed through the aperture 170 and that is tied to the branch of a tree. Although the plug member 154 is shown having a hole for being received by a mounting member, a plug member can alternately be designed to be decorative in appearance, and can include things such as a statue of a bird, flag or the like, depending upon the wishes and desires of the user. The plug 154 can also be designed to be functional, and include its own mounting member, such as a hook, strap, etc., that can be employed to couple the plug 154, and hence, the feeder 16 to a tree, pole, etc.

Preferably, the cylindrical tube 138 of the roof 16 and cylindrical tube 66 of the base 14 have generally similar diameters, so that each of them are capable of snugly receiving the coupling member 172 of the food engaging member 36, so that one can couple the food engaging member to the feeder 10, so that the food engaging rod member 40 either extends downwardly from the roof 16 (FIG. 16), or alternately, upwardly from the base (FIG. 13) to engage the interior passageway 32 of the food block member 22.

The food engaging member 31 includes two primary components, including the coupler 172, and the food engaging rod 40. The coupler 172 has a generally cylindrical body 174 having a proximal end 178, and a distal end 180 that includes an enlarged diameter flange 176 portion at the distal end 180. As used herein, the coupler 178 (FIG. 8) will be named for convenience but not limitation, as having the proximal end 178, and a distal end 180, with the distal end 180 being the end that includes the enlarged diameter portion flange 176. In this context, the terms "proximal" and "distal" are used in relation to the food block engaging rod 40, since the proximal end 178 of the coupler 172 is the end that is closest to the similarly named proximal end 184 of the food block engaging rod 40, whereas the distal end 180 is the end of coupler 172 that is disposed closest to the distal end 186 of the food block engaging rod 40, as shown in FIG. 10. As also shown in FIG. 10, the proximal end 184 of the food block engaging rod 40 is the relatively enlarged diameter portion that includes the transversely disposed, bar shaped locking member 240, and the enlarged diameter proximal head portion 192, that is used as a grip member to control the operation, movement and position of the food block engaging rod 40.

The coupler 172 includes a radially, outwardly facing, axially extending outer surface 196. The outer surface 196 is not cylindrical, but includes a plurality of surface features, many of which mirror the interior features of the coupler member. The coupler member 172 (shown in FIG. 8) is comprised of two molded halves, including first half 200 and second half 202 that are joined together by four screws 206 that extend between the two molded halves 200, 202.

One of the molded halves 200 is shown in FIG. 9. FIG. 9 has an appearance that one would expect, if one were to take a longitudinal sectional view of FIG. 8 along lines 9-9 of FIG. 8, wherein the plane in which the sectional view of FIG. 9 was cut comprised a plane that included and contained the long axis A of the coupler member 172. In FIG. 9, no hatching is shown on the surfaces of the coupler half 100, since the coupler half (FIG. 9) surface shown comprises an actual exterior surface of the first coupler half 100.

As shown in FIGS. 8 and 9, the outer surface of the coupler member 172 includes the distal head flange 176 that has a diameter that is relatively enlarged compared to the remainder of the coupler member 172. The distal end 180 of the coupler member 172 includes a radially extending, axially outwardly facing distal surface 208, and a radially extending, proximally facing surface 210. The generally cylindrical side surface 214 of the coupler member 172 also includes a pair of blind apertures 218, 220 that are disposed in an opposed relationship. The blind apertures 218, 220 are sized and positioned for receiving a retaining screw (FIGS. 14, 16) that passes through the radially extending aperture 72 of the tube 66, or 138 into which the coupler 172 is inserted.

Turning now to FIG. 13, the radially extending retaining screw 74 is shown as threadedly engaging the cylindrical tube 66 of the base member 14 with the distal end of the screw 74 being inserted into one of the blind apertures 218, 220 that is formed in the cylindrical outer side surface 214 of the coupler member 172. It will also be noted that the distal end 180 of the coupler member 172 has a diameter that is generally greater than the diameter of the cylindrical tube 66, 138. This prevents the coupler member 172 from being passed all of the way through the interior passageway of the cylindrical tube 66, 138. Further, the proximal facing surface 222 of the distal head flange 176 is sized and positioned to engage an upper surface 60 of the base member 14.

The interior features of the coupling member 172 will now be described with regard to FIGS. 8-13. The coupler member includes an axially extending passageway 226 that extends between the distal end 180 and the proximal end 178 of the coupler 172. The axially extending central passageway 226 (FIG. 9) includes three portions including a proximal portion 230 disposed adjacent to the proximal end 178, a distal portion 234 disposed adjacent to the distal end 180, and a central portion 236 disposed between the proximal 230 and distal 234 portions. The proximal portion 230 is generally ovaloid in configuration and may, rather than being strictly ovaloid, be "paper clip" or "race track"-shaped in cross section, wherein a pair of semicircular ends are joined by a pair of parallel lines that extend between the ends, as shown in FIG. 11A.

The ovaloid/race track cross section of the proximal portion 230 is sized and configured for receiving the generally bar shaped, or race track or elliptical, or ovaloid cross sectional transverse locking member 240 of the food engaging rod 40. Locking member 240 has a long dimension (FIG. 12) that extends generally perpendicular to the long axis of rod 40, and that is greater than the short dimension (FIG. 11) of the locking member 240. The locking member 240 can have a plurality of "one axis longer than the other axis" shapes, including bar shaped, race track shaped, oval shaped, flat sided oval shaped, ellipse shaped, flat sided ellipse shaped, tubular shaped and sausage or hot dog shaped.

The distal portion 234 of the axially extending passageway 226 of the coupler 172 has a diameter that is generally the smallest of the three portions of the axially extended passageway, and is preferably cylindrically tubular in shape and circular in cross section. The circular cross sectioned distal end portion 234 is sized and configured for receiving the circular cross section rod portion 252 of the food block engaging rod 40.

The distal end portion 186 of the food block engaging rod 252 is generally cylindrical and has a diameter that is approximately the size that one would expect of the diameter of a medium sized screw driver. The distal portion 234 of the coupler passageway 26 serves as a sleeve for receiving the distal rod portion 252 of the food engaging rod 40, and serves as a guide for guiding and restraining non-axial movement of the rod 252, so that the rod 252 has only a limited ability to move in anon-axial direction (e.g. pitch and yaw as it moves through passageway 226).

As is shown in FIG. 10, the distal end 186 of the rod 252 includes a radially extending pin. The radially extending pin 244 causes the distal end 186 of the rod 252 to have a greater diameter than the distal portion 230 of the axially extending passageway 226. Through this, the radially extending pin 244 prevents the rod 252 from moving axially and proximally through the axial passageway 226, and thereby captures the rod 40 within the passageway 226 and prevents the food engaging rod 40 from becoming disengaged from the coupler 172.

The diameter of the proximal portion 184 of the rod member 40 is also greater than the diameter of the distal portion 234 of the passageway 226. As such, the locking member 240 can extend through the ovaloid or race track-shaped proximal portion 234 of the passageway 226, and the relatively enlarged shape of the central locking portion 236 of the passageway 226, but cannot extend axially distally through the distal portion 230 of the passageway 226.

The central portion 236 of the passageway 226 includes two somewhat distinct sections, the relatively proximal section 238 and the relatively distal section 241. The relatively distal section 241 includes a relatively enlarged diameter portion on one side of the longitudinal axis, and a relatively reduced diameter portion on the opposed side of a longitudinal axis. Through this arrangement, the ovaloid-shaped head can rotate approximately 90° within the relatively distal section 241 of the central portion 236, from a passage position wherein the long axis of a locking head 242 is aligned with the radial extending long axis of the ovaloid proximal passageway 234 portion (as shown in FIG. 11), and a retained position (FIG. 12), wherein the long axis of the ovaloid locking member 242 is disposed generally perpendicularly to the radially extending long axis of the ovaloid shaped proximal portion 230 of the axially extending central passageway 226.

The other relatively proximal portion 238 of the central portion 236 of the axial passageway 228 is the locking portion. The locking proximal portion 238 includes a relatively reduced diameter portions on each side of the longitudinal axis A. Through this arrangement, rotation of the ovaloid locking member 242 within the relatively proximal section 238 of the central portion 236 of the axial passageway 226 is prohibited. In this position, the relative rotary position of the locking ovaloid member 242 is fixed.

In FIG. 11, the generally ovaloid locking member 240 is shown in the distal section 241 of the central portion 236 wherein its radially extending long axis is generally aligned with the radially extending long axis of the proximal portion 230 of the passageway 226. When in this release or passage position, the ovaloid locking member 240 is rotated in the distal section 241 into a position wherein it can be moved axially through the proximal portion 238 of passageway 226 until it is in a position, such as shown in FIG. 10 wherein the ovaloid locking member 240 is disposed exteriorly of the coupler 172. The locking member 240 can also be moved through the proximal portion 230 of passageway 226 until the locking member is moved into the distal section 240 of the central portion 236 (FIG. 11).

FIG. 12 shows the food block engaging rod 40 rotated 90°, so that the long axis of the ovaloid locking member 240 is disposed within the proximal section 230 of the central portion 236 of the axially extending passageway 226. When so positioned, the radially extending long axis of the ovaloid or bar shaped locking member 240 is also disposed generally perpendicularly to the radially extending long axis of the generally ovaloid shaped proximal portion 230 of the passageway 226. In this position, the locking member 240 is prevented in moving in an axially proximal direction into the proximal passageway 230.

As the proximal portion 230 is usually disposed below the distal portion 241 of central portion 236, gravity will aid in the locking member 240 dropping down from the distal section 241 into the proximal section 238. Gravity will also help to maintain the locking member 240 in the relatively lower proximal section 238. As such, when the coupler 172 and rod 40 are positioned as in FIG. 12, the ovaloid locking member 240 will be maintained within its position within the proximal section 238 of the central portion 236 of the passageway 226, and more importantly, the rod 40 will be placed at its appropriate axial position as shown in FIG. 12 wherein it can maintain its food engaging position within the axially extending passageway 32 of the food block 22.

Viewed another way, FIG. 12 shows the food engaging rod 40 in the food engaging position, wherein the distal end 186 of the rod 40 extends outwardly from the base 14 (FIG. 13) or roof 16 (FIG. 16) (depending upon where it is disposed) so that the rod 40 can be inserted through the interior passageway 32 of the food block 22 a sufficient distance so as to maintain the food block 22 on the base 14 of bird feeder 10 in the food receiving space, by preventing the food block 22 from moving laterally off the bird feeder 10. This is in contrast to the disengaged position, shown in FIG. 12. In the disengaged position, the locking member 240 is disposed exteriorly of the coupler 172, and the distal end 186 of the rod 40 is positioned next to the outwardly facing surface 208 of the distal end of the coupler 172. When in this position (also shown in FIG. 2B), the rod 40 provides sufficient "axial" space so that the food block can be moved laterally onto the base to place the food block 22 into position in the food receiving space 20, and moved laterally off the base 14 to remove the food block 22 from the bird feeder 10.

Turning now to FIG. 13, it will be noted that the proximal end 184 of the food engaging rod 40 includes a disk-shaped end member 192 that may include a knurled side surface 248. The disk-shaped knob member 192 has a diameter that is greater than the diameter of the axially extending interior passageway 226 of the coupler 172, so that the knob member 192 may not be inserted axially through the axial passageway 226 of the coupler member 172. The knob 192 provides an easily grabable and manipulable component that the user can grab, both to move the food engaging rod 40 axially between its food engaging position (FIG. 13, 16) and food release position (FIG. 2A), but also to rotate the rod about the long axis of the rod between its unlocked position (FIG. 11) and its locked position (FIGS. 12 and 13).

Disposed between the locking member 240 and the knob end 192 is a middle portion 250, that generally has a diameter that is greater than the diameter of the rod 252, but less than the diameter of either the locking portion 240 and the knob portion 192. The rod member 40 can be formed by an insert molding technique wherein a steel rod 252 is employed, to which a plastic locking member middle portion 250 and proximal knob 192 and locking member 240 are molded thereto.

Turning now to FIG. 14, it will be noted that the coupler member 172 is shown as being removed from the base member 14. It its place is inserted a tube 256, that is received by the cylindrical sleeve 66. This tube 256 can be the top end tube of a bird pole, such as the bird pole shown in the Wild Birds Unlimited®, Advanced Pole System® bird pole, shown in the Carpenter and Holscher U.S. Patent discussed above.

FIG. 15 shows the underside view of the roof member. It will be noted that the roof member includes a cylindrical tube 138 into which can be inserted by either the top plug 154 or a coupler member 172.

FIG. 16 shows the coupler 172 of the food block engaging member 36 inserted into the roof member 16. The coupler 172 is inserted so that the distal end 180 is inserted toward the food receiving space 20 of the bird feeder 10, so that when the food engaging rod 252 is placed in its disengaged position, the rod 252 will be moved axially upwardly, so that the distal end of the rod 186 is disposed adjacent to the outwardly facing surface 208 of the distal end portion 180. When in this position, sufficient axial space is provided in the food receiving space 20 so that the food block 22 can be removed laterally from the food receiving space 20 in the bird feeder 10 between the roof 16 and the base 14.

Turning now to FIG. 17, it will noted that the coupler 172 is removed, and a plug 154 containing an aperture 170 through which a shepherd's hook (not shown) can pass is inserted in its place.

To use the present invention, the food engaging mechanism 36 is assembled by placing the rod 40 within the interior axially extending passageway 236 so that the distal end 186 of the rod 252 extends outwardly from the distal end surface 208 of the coupling member 172. The four screws 206 that couple the two coupler halves 200, 202 are then attached, so that the two coupler halves 200, 202 are joined.

The coupler 172 is then inserted into either the base member 14 as shown in FIG. 13 or the roof member 16 as shown in FIG. 16, such that the distal end 180 of the coupler member faces the interior space 20 of the bird feeder 10, and the cylindrical side surfaces of the coupler 172 are received within the cylindrical tube 66, 138 of the respective base 14 or roof 16.

Figure 7:
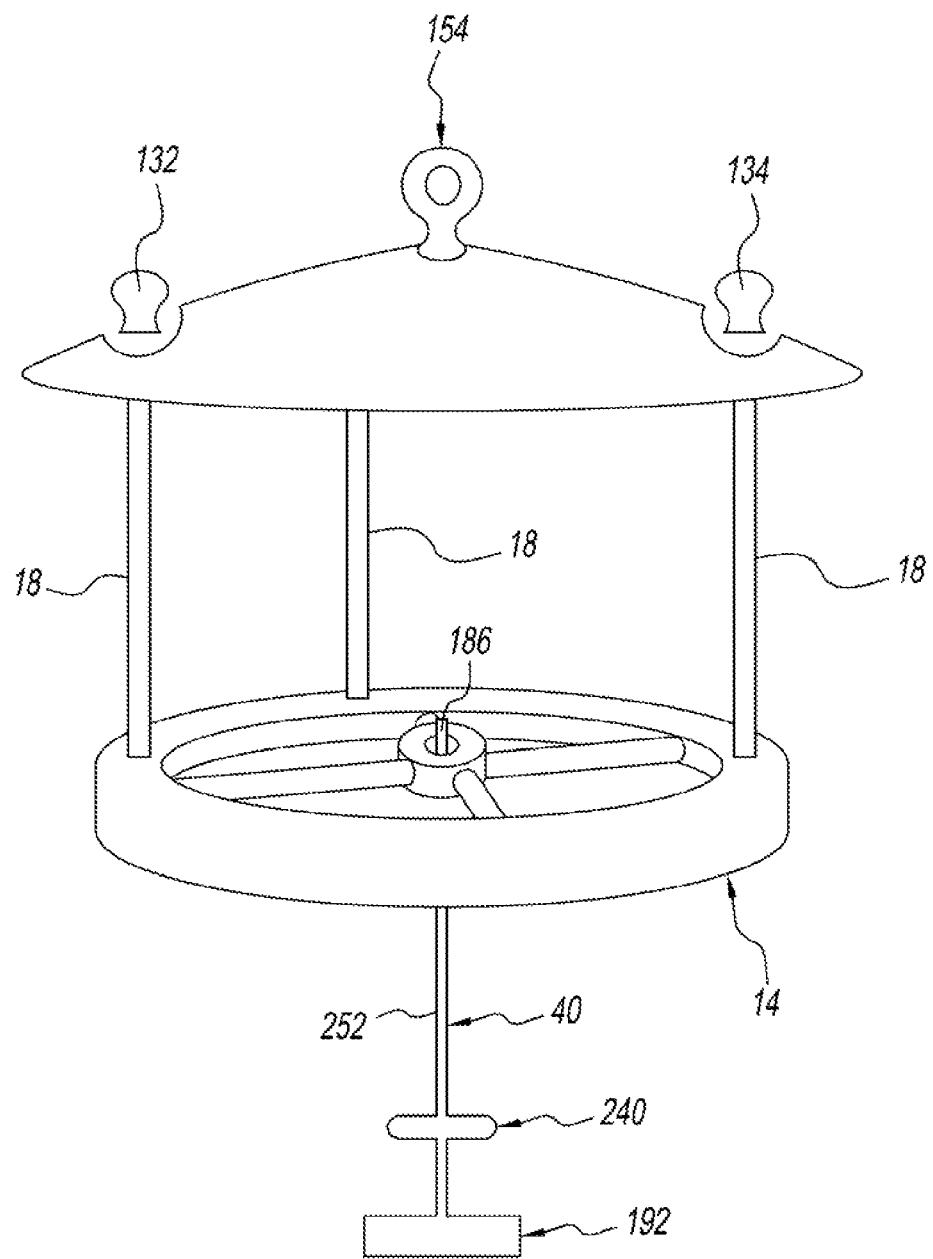
FIG. 7 is a side perspective view similar to FIG. 6, except that FIG. 7 shows the bird food block engaging member positioned in the food block release position.

The rod 40 is then placed in its disengaged position, as shown in FIG. 2B, FIG. 7 and FIG. 10. When in this position, sufficient axial space is provided in the food receiving space 20 between the base 14 and roof 16 so that the food block 22 can be moved laterally to its position as shown in FIGS. 1 and 2 where it is centrally positioned on the base 14, such that its bottom rests on the central portion 60 of the base 14, and so that the central aperture of the food block 22 is disposed coaxially with the food engaging rod 252 as shown in FIG. 3.

The rod 40 is then moved axially distally, to a position such as is shown in FIG. 11, where the locking member 240 is disposed within the relatively distal section 241 of the central portion 236 of the axially extending interior passageway 226. The distal knob 192 is then rotated 90° and the rod 40 is moved slightly axially proximally to a position such as is shown in FIGS. 12 and 13 when the locking head 240 is disposed within the relatively proximal section 238 of the central portion 230 of the axially extending passageway 226.

When in this position, the rod 252 should be inserted into the interior extending passageway 32 of the food block 22 a sufficient distance so that the rod 252 is inserted far enough into the passageway 32 of food block 22 to resist lateral movement of the food block. When a full length food block 22 is employed, there is also insufficient axial space between the roof 16 and the base 14 to allow the food block 22 to be moved laterally off the base. Also in this position, the axial position of the rod 252 is generally fixedly positioned in the food block engaged position so that it will maintain the relative axial position of the rod 40 so as to maintain the food block 22 in the food receiving space of the bird feeder 10.

Having described the invention in detail with respect to certain preferred embodiments, it will be appreciated that variations and modifications exist within the scope and spirit of the present invention.

What is claimed:

1. A wild animal feeder for holding a food block having a passageway therein, the feeder comprising:
    a base member,
    a roof member, the base member and roof member defining a food receiving space there between for receiving a food block,
    a food block engaging member having a proximal end and a distal end,
    a food block engaging member coupler attached to one of the base member and roof member for coupling the food block engaging member to one of the base member and roof member for permitting a food block engaging member to move between a food block engaging position wherein the food block engaging member is positioned in the food receiving space between the roof and base member to engage the food block for maintaining the food block on the feeder in the space between the base and roof member, and a food block release position wherein the food engaging member is positioned to permit the food block to be inserted into the food receiving space and at least two support members extending between the base member and the roof member for coupling the base member to the roof member, and fixedly positioning the base member to the roof member, to permit the food block engaging member to move between the food block engaging position and the food block release position without the base member and roof member being removed from their position fixed by the support members.

2. The wild animal feeder of claim 1 wherein the food block engaging member comprises a rod sized and configured for being received within a passageway in the feed block, and wherein the food block engaging member coupler comprises a rod coupler, the rod coupler including an axially extending passageway for slidably receiving the rod.

3. The wild animal feeder of claim 2 wherein the rod and coupler include a locking mechanism for fixedly positioning the rod in the food block engaging position.

4. The wild animal feeder of claim 1 wherein each of the roof and the base member include an aperture, the food block engaging member being receivable by one of the roof member aperture and base member aperture for permitting the food block engaging coupler to be coupled to the wild animal feeder, further comprising a support coupler member receivable by the other of the roof and base member aperture for permitting the wild animal feeder to be coupled to a support.

5. A wild animal feeder for holding a food block having a passageway therein, the feeder comprising:
a base member,
a roof member, the base member and roof member defining a food receiving space there between for receiving a food block,
a food block engaging member having a proximal end and a distal end,
a food block engaging member coupler attached to one of the base member and roof member for coupling the food block engaging member to one of the base member and roof member for permitting a food block engaging member to move between a food block engaging position wherein the food block engaging member is positioned in the food receiving space between the roof and base member to engage the food block for maintaining the food block on the feeder in the space between the base and roof member, and a food block release position wherein the food engaging member is positioned to permit the food block to be inserted into the food receiving space, wherein the food block engaging member comprises a rod sized and configured for being received within a passageway in the feed block, and wherein the food block engaging member coupler comprises a rod coupler, the rod coupler including an axially extending passageway for slidably receiving the rod, wherein the rod and coupler include a locking mechanism for fixedly positioning the rod in the food block engaging position, and wherein the locking mechanism includes a transversely disposed locking member coupled to the rod member.

6. The wild animal feeder of claim 5 where the locking member has a length dimension that is greater than its width dimension, and wherein the locking mechanism includes a locking member receiving portion of the axially extending passageway of the coupler.

7. The wild animal feeder of claim 6 wherein the locking member has a shape selected from the group consisting of bar shaped, race-track shaped, oval shaped, flat-sided oval shaped, ellipse shaped, flat-sided ellipse shaped, tubular shaped and sausage shaped.

8. The wild animal feeder of claim 6 wherein the axially extending passageway includes a distal portion having a first cross sectional area, a proximal portion having a second cross sectional area different from the first cross sectional area, and a central portion having a third cross sectional area different from each of the first and second cross sectional areas.

9. The wild animal feeder of claim 8 wherein the first cross sectional area of the distal portion is sized for slidably receiving the rod member, while preventing the locking member from moving therethrough, and the second cross section area of the proximal portion is larger than the first cross sectional area, and is sized and shaped for permitting the locking member to pass therethrough.

10. The wild life feeder of claim 9 wherein the second cross sectional area is large enough for permitting the locking member to pass therethrough, but small enough to prevent the rod to rotate more than about forty degrees when the locking member is in the distal portion of the axially extending passageway.

11. The wild life feeder of claim 9 wherein the central portion has a cross sectional area greater than the distal portion and a first portion wherein the central portion being sized and configured to permit the locking member and the rod to rotate, to thereby assume a position wherein the locking member cannot pass through the proximal portion to thereby maintain the rod member locked in the food block engaging position.

12. The wild life feeder of claim 9 wherein the second cross sectional area of the proximal portion is smaller than the third cross sectional area of the central cross sectional area but large enough to slidably receive the locking member within the proximal portion to allow the locking member to pass therethrough while being small enough in size and configuration to not permit it to rotate more than about forty degrees when the locking member is in the proximal portion.

13. The wild animal feeder of claim 12 wherein at least one of the base member and roof member includes a coupler receiving aperture, and wherein the coupler has a body having a proximal end, a distal end and an outwardly facing surface there between, the distal end outwardly facing surface being sized and configured to be received with the coupler receiving aperture, and the distal end having a diameter too large to pass through the coupler receiving aperture.

14. The wild animal feeder of claim 13 wherein each of the base member and roof member include a centrally disposed coupler receiving aperture for permitting the user to attach couplers to either of the base member and roof member.

15. The wild animal feeder of claim 13 wherein the axially extending passageway includes a distal portion having a first cross sectional area, a proximal portion having a second cross sectional area different from the first cross sectional area and a third cross sectional area different from each of the first and second cross sectional areas.

16. The wild animal feeder of claim 15 wherein the rod includes a transversely extending locking member, and wherein the first cross section area of the distal portion is sized for slidably receiving the rod while preventing the locking member from moving there through, and the second cross sectional area of the proximal portion is larger than the first cross sectional area, and is sized and shaped for permitting the locking member to pass there through.

17. The wild animal feeder of claim 15 wherein the rod includes a transversely extending locking member, and wherein the second cross sectional area of the distal portion is large enough to permit the locking member to pass there through, but small enough to prevent the rod to rotate more than about ten degrees when the locking member is in the proximal portion of the axially extending passageway.

18. The wild animal feeder of claim 15 wherein the rod includes a transversely extending locking member, and wherein the central portion includes a rotation portion and a locking portion, and has a third cross sectional area greater than the first cross sectional area of the distal portion, and wherein the rotation portion is sized and configured to permit the locking member to rotate in the central portion between a locking position wherein locking member is maintained within the central portion, and a release position where the locking member can move axially through the proximal portion of the axial passageway, and wherein the locking portion has a cross sectional area shaped for receiving the locking member while generally not permitting the locking member to rotate.

19. A wild animal feeder for holding a food block having a passageway therein, the feeder comprising:
   a base member,
   a roof member, the base member and roof member defining a food receiving space there between for receiving a food block,
   a food block engaging member having a proximal end and a distal end,
   a food block engaging member coupler attached to one of the base member and roof member for coupling the food block engaging member to one of the base member and roof member for permitting a food block engaging member to move between a food block engaging position wherein the food block engaging member is positioned in the food receiving space between the roof and base member to engage the food block for maintaining the food block on the feeder in the space between the base and roof member, and a food block release position wherein the food engaging member is positioned to permit the food block to be inserted into the food receiving space, and at least two support members extending between the base member and the roof member for coupling the base member to the roof member, and fixedly positioning the base member to the roof member, the support members including removable fasteners for permitting the support members to be selectively disengaged from at least one of the base and roof members to permit the base and roof member to be detached from each other.

20. A wild animal feeder for holding a food block having a passageway therein, the feeder comprising:
   a base member,
   a roof member, the base member and roof member defining a food receiving space there between for receiving a food block,
   a food block engaging member having a proximal end and a distal end,
   a food block engaging member coupler attached to one of the base member and roof member for coupling the food block engaging member to one of the base member and roof member for permitting a food block engaging member to move between a food block engaging position wherein the food block engaging member is positioned in the food receiving space between the roof and base member to engage the food block for maintaining the food block on the feeder in the space between the base and roof member, and a food block release position wherein the food engaging member is positioned to permit the food block to be inserted into the food receiving space, wherein the base member includes a central shelf for receiving an underside surface of a feed block, and a radially outwardly disposed tray portion for catching bird food that becomes separated from the block, and a perch member upon which birds can stand disposed radially outwardly of the tray portion.

* * * * *